United States Patent
O'Donnell (10) Patent No.: US 11,009,881 B2
(45) Date of Patent: May 18, 2021

(54) ROADWAY CENTER DETECTION FOR AUTONOMOUS VEHICLE CONTROL

(71) Applicant: Caterpillar Paving Products Inc., Brooklyn Park, MN (US)

(72) Inventor: Timothy O'Donnell, Long Lake, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 194 days.

(21) Appl. No.: 16/376,913

(22) Filed: Apr. 5, 2019

(65) Prior Publication Data
US 2020/0319646 A1 Oct. 8, 2020

(51) Int. Cl.
G05D 1/00 (2006.01)
G05D 1/02 (2020.01)
G06F 17/00 (2019.01)
G01C 21/26 (2006.01)
G08G 1/16 (2006.01)
G01C 21/34 (2006.01)
B60W 30/06 (2006.01)

(52) U.S. Cl.
CPC ......... G05D 1/0212 (2013.01); G05D 1/0088 (2013.01); G05D 2201/0202 (2013.01)

(58) Field of Classification Search
CPC ...... G05D 1/00; G05D 1/0212; G05D 1/0088; G05D 2201/0202; G08G 1/16; G08G 1/163; G01S 5/00; G01S 5/14; G06F 17/00; G01C 21/26; B60W 30/06
See application file for complete search history.

(56) References Cited

U.S. PATENT DOCUMENTS

| | | | |
|---|---|---|---|
| 5,979,581 A | 11/1999 | Ravani et al. | |
| 6,473,678 B1 | 10/2002 | Satoh et al. | |
| 7,149,533 B2 * | 12/2006 | Laird | A61B 5/1117 455/456.3 |
| 8,121,350 B2 * | 2/2012 | Klefenz | G06T 7/73 382/104 |
| 8,948,958 B1 | 2/2015 | Ferguson et al. | |
| 10,019,014 B2 | 6/2018 | Prasad et al. | |
| 10,234,858 B2 * | 3/2019 | Cashier | B60W 30/18163 |
| 2005/0085257 A1 * | 4/2005 | Laird | A61B 5/04 455/550.1 |
| 2010/0329513 A1 * | 12/2010 | Klefenz | G06K 9/00805 382/104 |
| 2016/0026253 A1 * | 1/2016 | Bradski | H04N 13/344 345/8 |
| 2017/0240171 A1 | 8/2017 | Chia et al. | |

(Continued)

Primary Examiner — Yonel Beaulieu
(74) Attorney, Agent, or Firm — Harrity & Harrity LLP; Jeff A. Greene (57) ABSTRACT

A control system for an autonomous vehicle is disclosed. The control system may receive information that identifies distances, measured by a sensor of the autonomous vehicle, to different points of a roadway. The control system may generate a representation of a curve based on the information that identifies the distances. The representation of the curve may include a series of points that represent a curvature of the roadway. The control system may identify a point, of the series of points, that satisfies a condition based on the representation of the curve. The control system may store, in the memory, an indication that the point is a center point of the roadway.

20 Claims, 6 Drawing Sheets

(56) References Cited

U.S. PATENT DOCUMENTS

| | | |
|---|---|---|
| 2018/0099667 A1 | 4/2018 | Abe et al. |
| 2018/0237007 A1 | 8/2018 | Adam et al. |
| 2018/0299887 A1 | 10/2018 | Cashler et al. |
| 2019/0340876 A1* | 11/2019 | Northrup ................ H04L 63/08 |

* cited by examiner

FIG. 6 ly to autonomous
vehicles and, more particularly, to roadway center detection
for autonomous vehicle control.

ROADWAY CENTER DETECTION FOR AUTONOMOUS VEHICLE CONTROL

TECHNICAL FIELD

The present disclosure relates generally to autonomous vehicles and, more particularly, to roadway center detection for autonomous vehicle control.

BACKGROUND

An autonomous vehicle may include a control system to assist with automated steering based on detection of a roadway feature. In some cases, the control system may determine a center of a lane of a roadway to assist with maintaining a position of the autonomous vehicle in the center of the lane. One attempt to determine the center of a lane of a roadway is disclosed in U.S. Pre-Grant Publication No. 20180299887 ("the '887 publication"). In particular, the '887 publication discloses that a "camera 50 may detect a lane-marking 60 of the travel-lane 52 . . . . The camera 50 may also detect the lane-marking 60 on a left-side and a right-side of the travel-lane 52. The camera 50 may detect the lane-marking 60 that is a dashed-line (not specifically shown) and may detect the lane-marking 60 that is a solid-line (not specifically shown) . . . . The controller 28 may also be configured (e.g. programmed or hardwired) to determine a centerline (not shown) on the roadway 36 for the host-vehicle 12 based on the lane-marking 60 detected by the camera 50 . . . . By way of example and not limitation, the centerline is preferably in the middle of the travel-lane 52 defined by the lane-marking 60 of the roadway 36." However, in some situations, the roadway may not include lane markings, such as when the roadway is unpaved or unmarked. The systems and methods of the present disclosure solve one or more of the problems set forth above and/or other problems in the art.

SUMMARY

A method may include receiving, by a control system of an autonomous vehicle, information that identifies distances to one or more objects located in proximity of the autonomous vehicle; detecting, by the control system, a ground surface based on the information that identifies the distances; determining, by the control system, a series of points of the ground surface based on the information that identifies the distances, the series of points forming a curve that represents a curvature of a roadway on the ground surface; determining, by the control system, a point, of the series of points, that satisfies a condition relative to one or more other points of the series of points; marking, by the control system, the point as a center point of the roadway; and transmitting, by the control system, an instruction to control a drive system of the autonomous vehicle or an implement system of the autonomous vehicle based on marking the point as the center point.

A control system of an autonomous vehicle may include memory, one or more sensors, and one or more processors communicatively coupled to the memory. The one or more processors may be configured to receive information that identifies distances, measured by the one or more sensors, to different points of a ground surface on which the autonomous vehicle is traveling; determine a series of points of the ground surface based on the information that identifies the distances, the series of points forming a curve that represents a curvature of a roadway of the ground surface; determine a point, of the series of points, that satisfies a condition based on the curve; and mark the point as a center point of the roadway.

An autonomous vehicle may include a sensor and one or more controllers. The one or more controllers may be configured to receive information that identifies distances, measured by the sensor, to different points of a roadway; generate a representation of a curve based on the information that identifies the distances, the representation of the curve including a series of points that represent a curvature of the roadway; identify a point, of the series of points, that satisfies a condition based on the representation of the curve; and store, in the memory, an indication that the point is a center point of the roadway.

DETAILED DESCRIPTION

Figure 1:
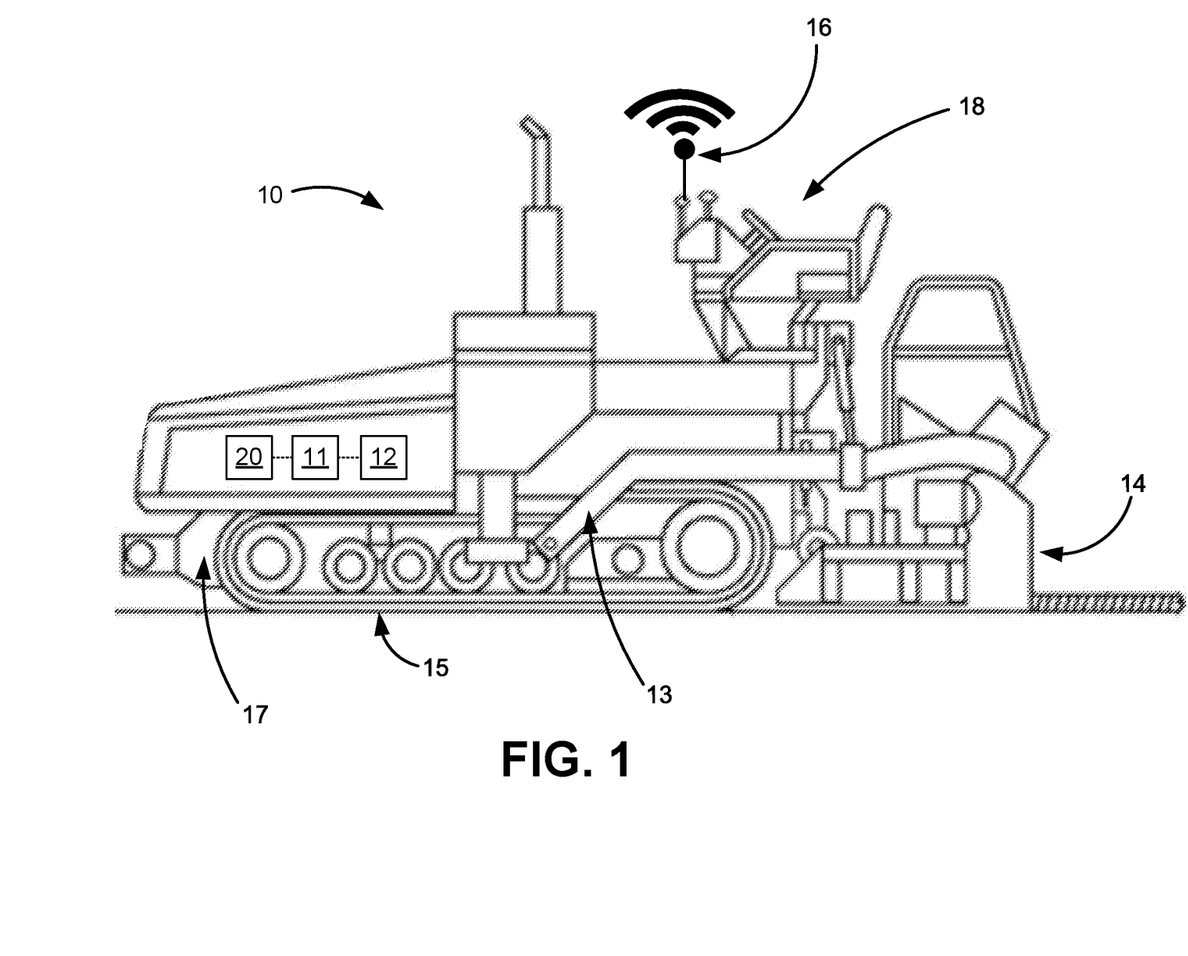
FIG. 1 is a diagram of an example vehicle.

FIG. 1 is a diagram of an example vehicle 10. The vehicle 10 may be an autonomous vehicle, which may include any type of fully autonomous or partially autonomous vehicle that travels on a roadway. For example, the vehicle 10 may be a paving machine, as shown in FIG. 1. However, implementations described herein may apply to various types of vehicles, such as a milling machine, a cold planer, a road roller, a compactor, a roadway marking machine, a wheel loader, a road reclaimer, or another type of vehicle The vehicle 10 may include, among other things, a drive system 11, a transmission system 12, an implement linkage system 13, a work implement 14 (e.g., shown as a screed, but which may include a bucket, a shovel, a scraper, and/or the like), multiple ground engaging members, and a global positioning system (GPS) component 16. The ground engaging members may be in the form of tracks 15 for a track-type vehicle, as shown in FIG. 1. Alternatively, the ground engaging members may be in the form of wheels. The ground engaging members may support and transport a frame 17 of the vehicle 10.

In some cases, when an operator assists in operating the vehicle 10, the vehicle 10 may include an operator station 18. For example, for an autonomous vehicle, the drive system 11 may be autonomous or semi-autonomous, while the implement linkage system 13 may be controlled partially or fully by an operator. As another example, the drive system 11 and/or the implement linkage system 13 may be partially autonomous or semi-autonomous, and the operator may intervene with operations of the drive system 11 and/or the implement linkage system 13 based on observing an issue with such operations and/or based on feedback from a control system 20 of the vehicle 10. The operator station 18 may include one or more controls via which the operator can provide input and/or receive output, respectively. Such control(s) may include, for example, a screen, a touch screen, a heads-up display, a warning light, a steering wheel, a knob, a lever, and/or the like.

The drive system 11 may include an engine. The transmission system 12 may include gears, differential systems, axles, and/or other components that are coupled to the drive system 11 and the tracks 15. The transmission system 12 may be configured to transfer power from the drive system 11 to the tracks 15 to drive the vehicle 10. The implement linkage system 13 may be operatively coupled to the work implement 14. The implement linkage system 13 may include hydraulically actuated linkages that enable articulation, linkage, and/or use of work implement 14 during operation. The implement linkage system 13 is shown as a set of screed support arms, but other mechanisms are possible. The work implement 14 may operatively perform functions such as, but not limited to, hauling, dumping, and/or removing materials. The GPS component 16 may include, for example, a GPS antenna, a GPS receiver, and/or the like, and may be used to determine a location of the vehicle 10. In some implementations, the vehicle 10 may include a control system 20, as described in more detail below.

As indicated above, FIG. 1 is provided as an example. Other examples may differ from what is described in connection with FIG. 1.

Figure 2:
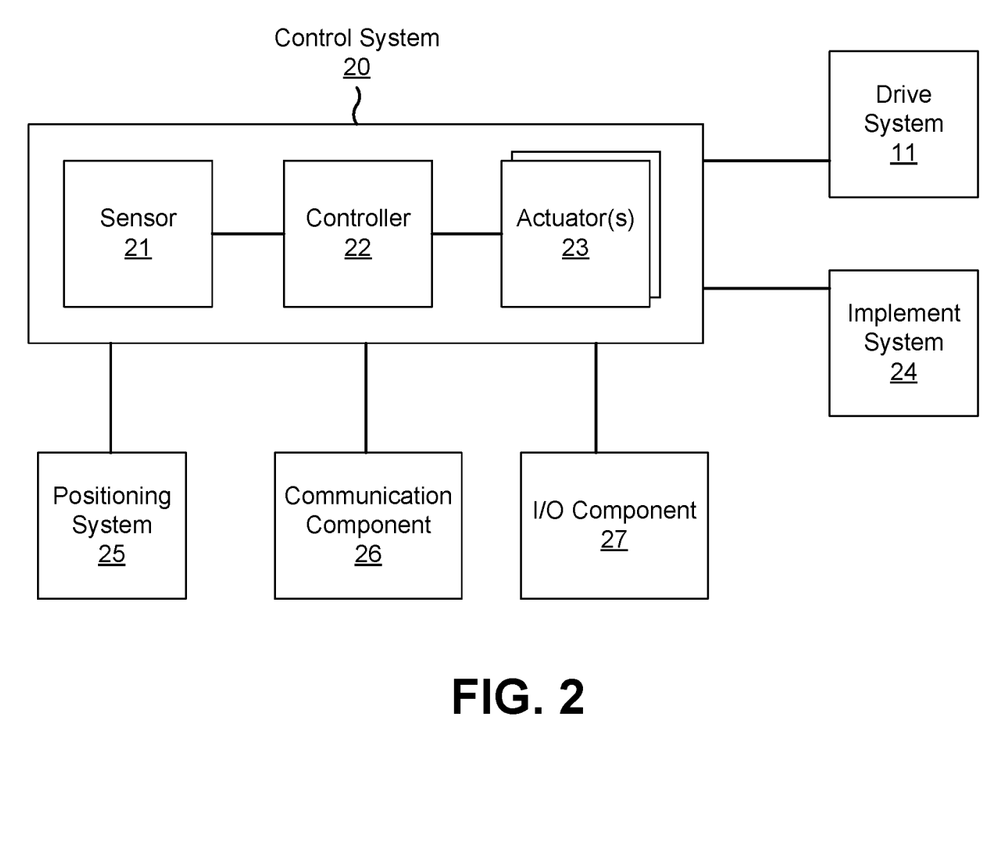
FIG. 2 is a diagram of an example control system of the vehicle of FIG. 1.

FIG. 2 is diagram of example components that may be integrated into and/or mounted on the vehicle 10. As shown, the vehicle 10 may include a control system 20, which may include a sensor 21, a controller 22, and one or more actuators 23 that act on one or more other systems of the vehicle 10, such as the drive system 11 or an implement system 24, which may include the implement linkage system 13 and/or the work implement 14. Additionally, or alternatively, the vehicle 10 may include a positioning system 25, a communication component 26, and/or an input/output (I/O) component 27. One or more of the components shown in FIG. 2 may be used as means for performing one or more operations described herein, such as process 60 of FIG. 6.

The sensor 21 includes one or more sensors for detecting distances or ranges to objects within proximity of the vehicle 10, such as a ground surface, a roadway, one or more fixed objects (e.g., a road cone, a barrier, a guard rail, a parked vehicle, and/or the like), one or more moving objects (e.g., other vehicles, pedestrians, and/or the like). For example, the sensor 21 may include a radar sensor, a lidar sensor, a camera (e.g., a video camera), and/or the like. The sensor 21 may be mounted to and/or affixed to the vehicle 10. The vehicle 10 may include a single sensor 21 (e.g., positioned on the front of the vehicle 10) or multiple sensors 21 positioned at different locations on the vehicle (e.g., a front sensor, a rear sensor, a side sensor, a bottom sensor, and/or the like).

The controller 22 includes memory and one or more processors. A processor is implemented in hardware, firmware, or a combination of hardware and software. The controller 22 may receive input from one or more sensors 21, such as information that indicates distances to objects within proximity of the vehicle 10. The controller 22 may process the input to determine a center point of a roadway on which the vehicle is traveling, as described in more detail elsewhere herein. The controller 22 may generate output based on such processing and may transmit the output to one or more actuators 23 to control one or more systems of the vehicle 10, such as the drive system 11 and/or the implement system 24. While the actuators 23 are shown as being part of the control system 20, in some implementations, an actuator 23 may be implemented in a system upon which the actuator acts, such as the drive system 11, the implement system 24, or the like. In some implementations, the sensor 21 may include a camera that captures images, and the controller 22 may include an image processor that processes the images.

The positioning system 25 includes one or more components capable of determining a position of the vehicle 10, such as a GPS component 16. The positioning system 25 may be used to validate a center point of a roadway determined by the controller 22, as described in more detail elsewhere herein.

The communication component 26 may be used to communicate with one or more other vehicles, such as via a wireless connection. For example, the communication component 26 may include a wireless local area network (WLAN) component (e.g., a Wi-Fi component), a radio frequency (RF) communication component, and/or the like.

The I/O component 27 includes an input component and/or an output component via which an operator of the vehicle 10 can provide input to the control system 20 and/or receive output generated by the control system 20. The I/O component 27 may include, for example, a screen, a display, a touch screen, a heads-up display, an in-dash unit, and/or the like. The I/O component 27 may be integrated into the vehicle 10. Alternatively, the I/O component 27 may be separate from the vehicle 10. For example, the I/O component 27 may include a phone (e.g., a smart phone), a tablet computer, a handheld computer, a laptop, and/or the like.

Control system 20 may perform operations and/or processes described herein, such as operations described below in connection with FIGS. 3-5 and/or process 60 of FIG. 6. Control system 20 may perform these processes based on controller 22 (e.g., one or more processors of controller 22) executing software instructions stored by a non-transitory computer-readable medium, such as a memory of controller 22. A computer-readable medium is defined herein as a non-transitory memory device. A memory device includes memory space within a single physical storage device or memory space spread across multiple physical storage devices. In some implementations, software instructions may be read into the memory. When executed, software instructions stored in the memory may cause controller 22 to perform one or more operations and/or processes described herein.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) of FIG. 2 may perform one or more functions described as being performed by another set of devices of FIG. 2.

Figure 3:
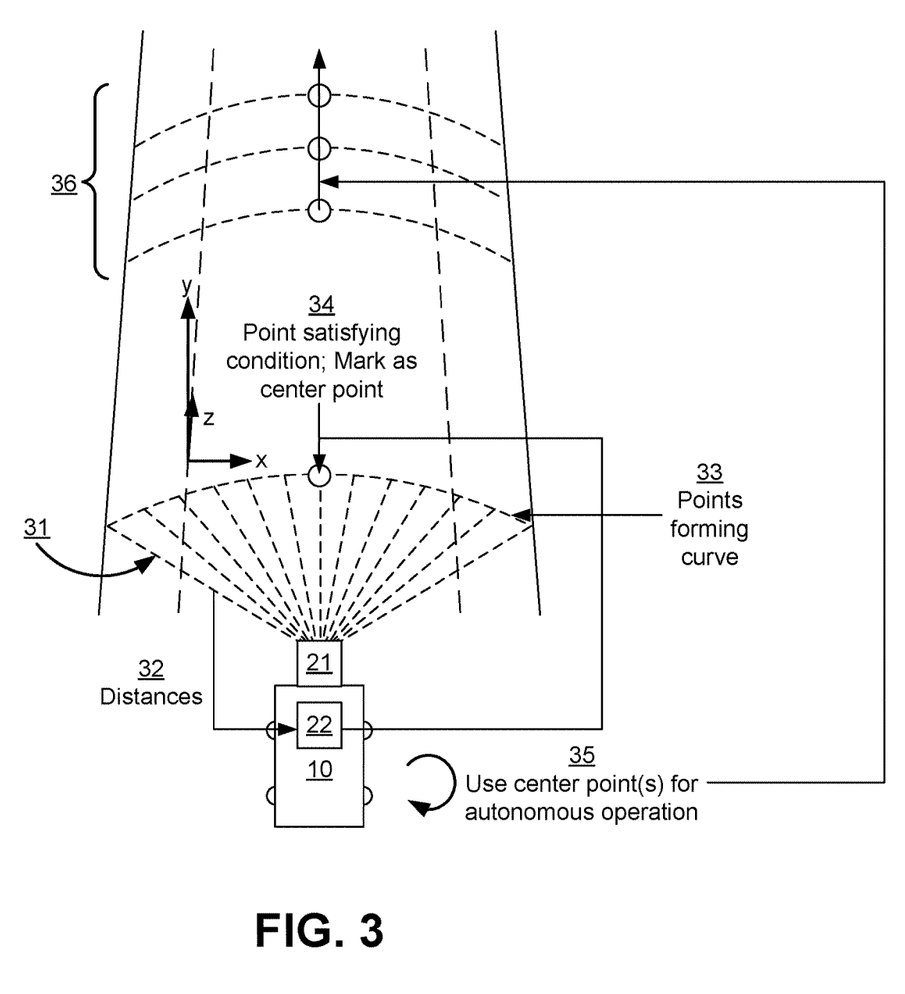
FIGS. 3-5 are diagrams of example operations performed by the control system of FIG. 2 and/or the vehicle of FIG. 1.

FIG. 3 is a diagram of example operations performed by the control system 20 and/or the vehicle 10. As shown by reference number 31, the sensor 21 may measure distances to one or more objects located in proximity of the vehicle 10 (e.g., using radar, lidar, computer vision, and/or other techniques). The distances may include, for example, distances to various points on a ground surface on which the vehicle 10 is positioned and/or traveling. The ground surface may include a roadway, which may be paved, unpaved, or partially paved. In some cases, the roadway may not include roadway markings, such as lane lines, edge lines, and/or the like.

As shown by reference number 32, the controller 22 may receive, from the sensor 21 (and/or from multiple sensors 21) information that identifies the measured distances. The controller 22 may process the received information to detect and/or identify a ground surface (e.g., a roadway). Additionally, or alternatively, as shown by reference number 33, the controller 22 may use the measured distances to determine a series of points of the ground surface. The series of points may form a curve that represents a curvature of a roadway on the ground surface. Although FIG. 3 shows a two-dimensional (2D) curve that connects a single point on a left edge of the roadway and a single point on a right edge of the roadway, in some implementations, the controller 22 may generate a 3D curve. For example, the controller 22 may use three-dimensional (3D) modeling (e.g., using a 3D point analysis, a 3D point cloud, and/or the like) to generate a representation of the curve in memory of the controller 22.

As shown by reference number 34, the controller 22 may determine a point, of the series of points, that satisfies a condition relative to other points in the series of points. Based on determining that the point satisfies the condition, the controller 22 may mark the point as a center point of the roadway (e.g., along the curve). The controller 22 may perform such marking by storing, in memory, information that identifies the point and an indication that the point is a center point of the roadway.

To identify the point that satisfies the condition, the controller 22 may store, in memory, a representation of the series of points that form the curve. For example, the controller 22 may store information that identifies the points along the curve using a coordinate system, such as a 2D coordinate system (e.g., having an x and y coordinate along a 2D curve) or a 3D coordinate system (e.g., having an x, y, and z coordinate along a 3D curve). In this case, the controller 22 may store a representation of a point using a first coordinate (e.g., an x coordinate) that represents a position of the point along the curve in a first dimension (e.g., laterally or horizontally along the curve or roadway) and a second coordinate (e.g., a y coordinate) that represents a height of the point in a second dimension (e.g., vertically along the curve or roadway). Alternatively, the controller 22 may store a representation of the point using the first coordinate, the second coordinate, and a third coordinate (e.g., a z coordinate) that represents a position of the point along a third dimension that is orthogonal to the first dimension and the second dimension (e.g., a perpendicular distance away from the vehicle 10 or the sensor 21).

In some implementations, the controller 22 may identify a point that has a highest height along the curve (e.g., a 2D curve or a plane that divides a 3D curve to create a 2D curve) and may mark that point as the center point. This may occur in a curved roadway that slopes downward from the center of the roadway to both roadway edges (e.g., a left edge and a right edge). The controller 22 may mark the point with the highest height along the curve as the center point based on determining that the roadway slopes downward from the center of the roadway to both roadway edges. For example, the controller 22 may determine that a left edge of the roadway and a right edge of the roadway have heights that are within a threshold tolerance (e.g., have a same height or a height that differs by an amount that is less than or equal to a threshold), and may mark the point with the highest height as the center point based on this determination. This point may be an apex of the curve, and the curve may represent a crown of the roadway.

In some cases, the controller 22 may compare the second coordinate (e.g., representing the height) for multiple points to determine which point satisfies the condition (e.g., to determine which point has the highest height). For example, the controller 22 may compare the second coordinate for all points having the same third coordinate (e.g., the same z coordinate) to determine which of those points has the highest height. The controller 22 may mark that point as the center point. In some implementations, the controller 22 may identify a point satisfying a different condition (e.g., other than the highest height) as the center point, an example of which is described below in connection with FIG. 4.

The controller 22 may validate the identified point before marking the identified point as the center point and/or before performing an autonomous operation based on the center point. For example, the controller 22 may use positioning data (e.g., GPS data), received from the positioning system 25 (e.g., the GPS component 16), to validate the identified point. In this case, the controller 22 may estimate a position of the identified point, such as by using a GPS position of the vehicle 10 and a distance and/or direction to the identified point (e.g., measured by the sensor 21). The controller 22 may compare the estimated position (e.g., an estimated GPS position) to a stored GPS position that indicates the center of the roadway. If the estimated position is within a threshold distance of the stored GPS position (e.g., a threshold that account for GPS inaccuracies, such as 3 centimeters, 2 centimeters, 1 centimeter, or the like), then the controller 22 may validate the identified point as the center point and may use the center point for an autonomous operation. If the estimated position fails validation (e.g., is not within the threshold distance), then the controller 22 may select a different point to validate (e.g., the point with the second highest height along the curve) and/or may request input from an operator (e.g., using I/O component 27) to identify the center point. In some implementations, the controller 22 may request input from the operator if a threshold number of points fail the validation (e.g., two points, three points, or the like).

In some cases, the controller 22 may determine that multiple points satisfy a condition. For example, the controller 22 may determine that two or more points have the same highest height along the curve. In this case, the controller 22 may perform validation (e.g., GPS validation, operator validation, and/or the like) to select one of the points as the center point. For example, the controller 22 may select the point that is closest to a GPS-indicated center of the roadway. Additionally, or alternatively, the controller 22 may provide output to the I/O component 27 to request input by an operator to select the point to be marked as the center point (e.g., for operator validation). Additionally, or alternatively, the controller 22 may compare the center point with a previously determined center point (e.g., one that is located closer to the vehicle 10) to perform validation (e.g., to determine whether the determined center point is within a threshold distance of the previously determined center point).

As shown by reference number 35, the controller 22 may perform one or more autonomous operations based on determining and/or marking the center point of the roadway. For example, the controller 22 may transmit an instruction to the drive system 11 to perform automated steering to direct or maintain a position of the vehicle 10 relative to the center point of the roadway. Additionally, or alternatively, the controller 22 may transmit an instruction to the implement system 24 to control a position of a work implement 14 relative to the center point of the roadway. Additional details are described below in connection with FIG. 4.

Figure 4:
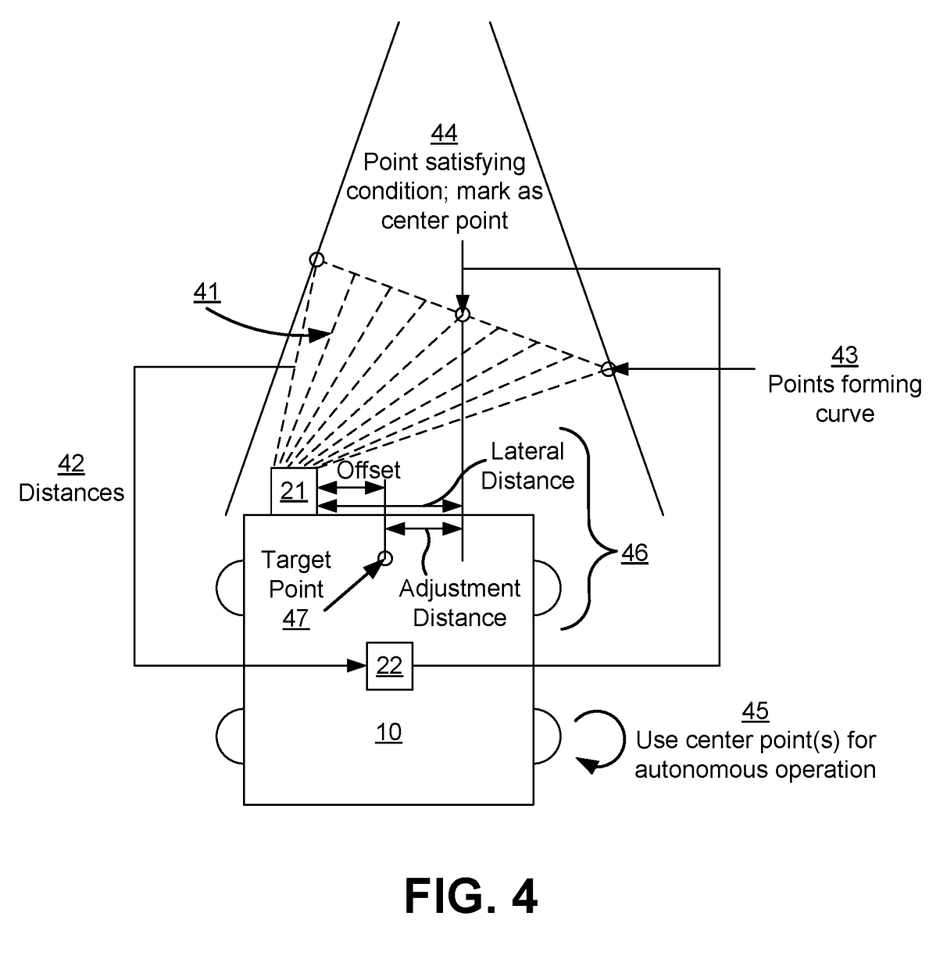
Figure 5:
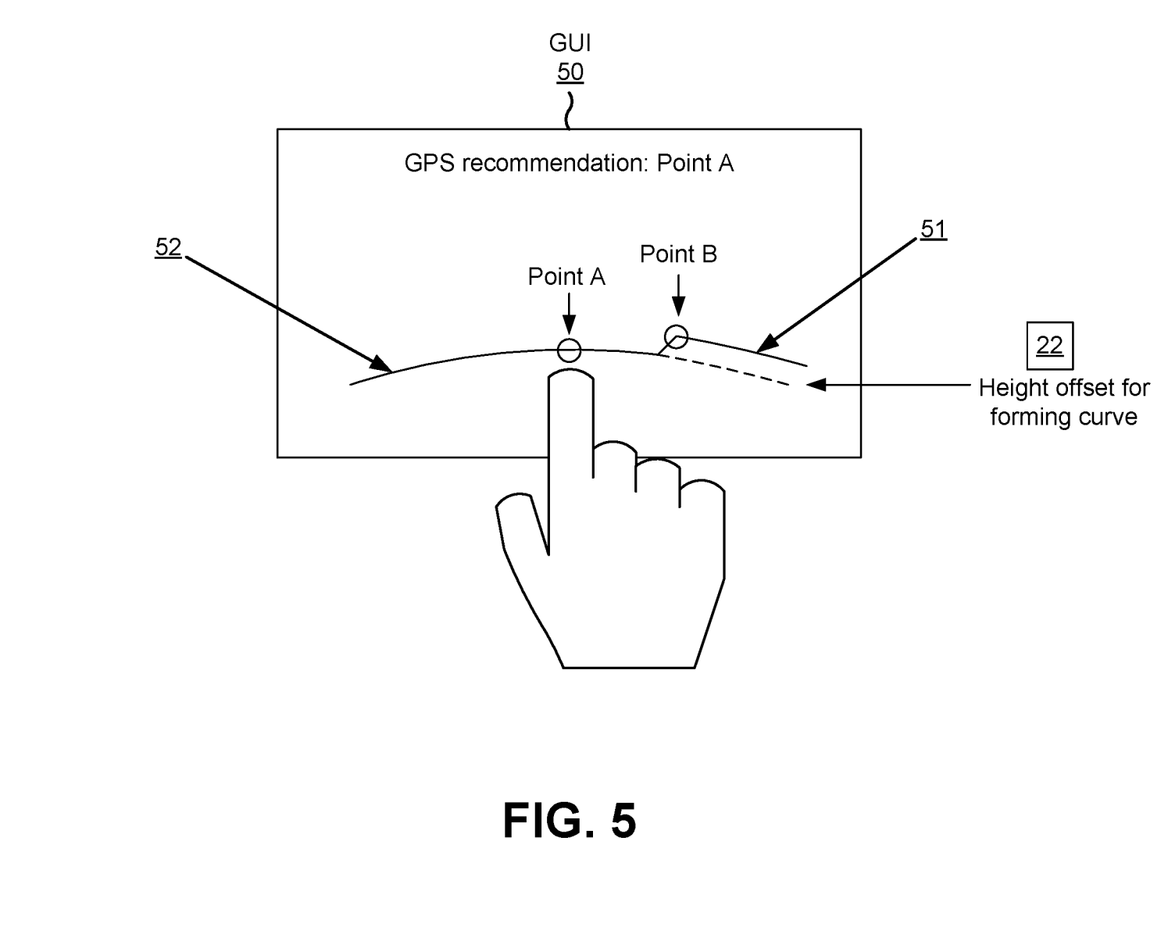

As shown by reference number 36, the controller 22 may perform similar operations as described above or in connection with FIG. 4 and/or FIG. 5 to determine multiple center points along the roadway (e.g., in a direction of travel of the vehicle 10). The center points may form a centerline or center curve of the roadway, and the controller 22 may transmit instructions to the drive system 11 and/or the implement system 24 to steer the vehicle 10 and/or control a work implement 14 of the vehicle 10 relative to the centerline or center curve.

As indicated above, FIG. 3 is provided as an example. Other examples may differ from what is described in connection with FIG. 3.

FIG. 4 is a diagram of example operations performed by the control system 20 and/or the vehicle 10. As shown by reference number 41, the sensor 21 may measure distances to one or more objects located in proximity of the vehicle 10, as described above in connection with FIG. 3. As shown by reference number 42, the controller 22 may receive, from the sensor 21 (and/or from multiple sensors 21) information that identifies the measured distances, as described above in connection with FIG. 3. As shown by reference number 43, the controller 22 may use the measured distances to determine a series of points of a ground surface (e.g., a roadway), as described above in connection with FIG. 3.

As shown by reference number 44, the controller 22 may determine a point, of the series of points, that satisfies a condition relative to other points in the series of points. In some implementations, the controller 22 may identify a point that has a height that is approximately halfway between a highest height of a point along the curve and a lowest height of a point along the curve and may mark that point as the center point. In some cases, the point having the height that is "approximately halfway" between the highest height and the lowest height may refer to the point, stored in memory, that has a height that is closest to a height that is halfway between the highest height and the lowest height (e.g., in case the controller 22 does not store a representation of a point with a height that is exactly halfway between the highest height and the lowest height).

The controller 22 may use mark the point with the height that is approximately halfway between the highest height and the lowest height as the center point based on determining that the roadway slopes downward from a first roadway edge (shown as the left edge) to a second roadway edge (shown as the right edge). For example, the controller 22 may determine that a left edge of the roadway and a right edge of the roadway have heights that are not within a threshold tolerance (e.g., have a height that differs by an amount that is greater than or equal to a threshold), and may mark the point with the height that is approximately halfway between the highest height (e.g., which may be a height of a first point at the first roadway edge) and the lowest height (e.g., which may be a height of a second point at the second roadway edge) as the center point based on this determination.

In some cases, the controller 22 may compare the second coordinate (e.g., representing the height) for multiple points to determine which point satisfies the condition (e.g., to determine which point has the approximate halfway height). For example, the controller 22 may compare the second coordinate for all points having the same third coordinate (e.g., the same z coordinate) to determine which of those points has the highest height and which of those points has the lowest height. The controller 22 may calculate a height that is halfway between the highest height and the lowest height and may identify a point that has the height that is halfway between the highest height and the lowest height or that has a height that is closest to the height that is halfway between the highest height and the lowest height. The controller 22 may mark that point as the center point. In some implementations, the controller 22 may identify a point satisfying a different condition (e.g., other than the highest height or the approximate halfway height) as the center point.

In some implementations, the controller 22 may receive input from an operator to determine whether to use the highest point or the point with the approximate halfway height as the center point. For example, the operator may provide input to toggle between different conditions to be used to identify the center point. Additionally, or alternatively, the controller 22 may analyze data received from the sensor 21 to determine whether to use the highest point or the point with the approximate halfway height as the center point. For example, the controller 22 may analyze a slope of the curve to determine the condition to be applied to identify the center point.

As shown by reference number 45, the controller 22 may perform one or more autonomous operations based on determining and/or marking the center point of the roadway, as described above in connection with FIG. 3. As shown by reference number 46, the controller 22 may perform one or more calculations to determine an instruction to be provided to the drive system 11 and/or the implement system 24. The calculation(s) may be used to adjust for a position of the sensor 21 on the vehicle 10, a position of the tracks 15 on the vehicle 10, a centerline of the vehicle 10, a position of a work implement 14 linked to the vehicle 10, and/or the like.

As shown, the controller 22 may determine a first lateral distance (shown as lateral distance) between the sensor 21 and the point marked as the center point of the roadway. As used herein, lateral may refer to the first dimension (e.g., the x dimension). Thus, the lateral distance may be a distance along the first dimension (e.g., the x dimension). As further shown, the controller 22 may determine a lateral offset (shown as offset) between the sensor 21 and a target point 47 associated with the vehicle 10. The target point 47 may be a point along a centerline of the vehicle 10, such as when the controller 22 controls a drive system 11 of the vehicle 10 to maintain a position of the vehicle 10 relative to a center of the roadway. Alternatively, the target point may be a point aligned with a work implement 14 of the vehicle 10, such as when the controller 22 controls a position of the work implement 14 relative to a center of the roadway.

As further shown, the controller 22 may determine a second lateral distance (shown as adjustment distance) between the target point and the center point of the roadway based on the first lateral distance and the offset. For example, the second lateral distance may be determined as a difference between the first lateral distance and the offset, as shown (e.g., the first lateral distance minus the offset in some cases, or the first lateral distance plus the offset in other cases). The controller 22 may transmit an instruction to the drive system 11 and/or the implement system 24 based on the second lateral distance. Based on receiving such instruction, the drive system 11 may steer the vehicle 10 toward the center of the roadway, may steer the vehicle toward a location on the roadway relative to the center of the roadway, may steer the vehicle 10 to align a work implement 14 relative to the center of the roadway, and/or the like. Additionally, or alternatively, based on receiving such instruction, the implement system 24 may control a position of a work implement 14 (e.g., using an implement linkage system 13) relative to the center of the roadway.

As indicated above, FIG. 4 is provided as an example. Other examples may differ from what is described in connection with FIG. 4.

FIG. 5 is a diagram of example operations performed by the control system 20 and/or the vehicle 10. As shown in FIG. 5, an I/O component 27 may be used to output a graphical user interface (GUI) 50. An operator may be capable of interacting with the GUI 50 to assist with one or more operations described herein. For example, the operator may provide input to validate a point identified as the center point, as described above. As also described above, in some cases, the controller 22 may identify multiple points that satisfy a condition, shown as Point A and Point B. In this case, the controller 22 may request input from an operator via GUI 50 to select one of the points as the center point of the roadway.

In FIG. 5, Point A represents the center of the roadway, and Point B represents an edge of a milling cut, where the roadway is being milled and repaved. As shown, the controller 22 may perform GPS validation, as described above, and may output a recommendation for the center point based on the GPS validation. In the example of FIG. 5, Point A is closer than Point B to the GPS-indicated center of the roadway, so the controller 22 recommends selection of Point A as the center of the roadway. As shown, an operator may interact with a representation of Point A on the GUI 50 to select Point A. The controller 22 may receive input based on such interaction and may mark Point A as the center point of the roadway.

In some implementations, the controller 22 may detect the milling cut or other roadway feature that results in a height offset for a portion of the roadway and may account for such height offset when determining the center point. For example, a first portion 51 of the roadway may have a higher height due to paving, and a second portion 52 of the roadway may be unpaved and have a lower height. The controller 22 may determine that the first portion 51 is associated with a height offset that satisfies a condition relative to the second portion 52 (e.g., that is higher than the second portion 52 by a height offset that is greater than or equal to a threshold). The controller 22 may offset the height offset to form a first portion of the curve (shown as a dashed line in FIG. 5) and may combine the first portion of the curve with a second portion curve that corresponds to the second portion 52 of the roadway. For example, the controller 22 may form the first portion of the curve by modifying a second coordinate (e.g., a y coordinate) of points along the first portion 51 of the roadway (e.g., by subtracting the height offset from the second coordinate). Such offsetting may be performed with or without operator input. In some cases, operator input may be received in connection with a first point for a first curve, and the controller 22 may then offset the height for the first portion 51 for other curves along the roadway.

Although some techniques described herein use a center point of the roadway as a relative point to perform autonomous operations, another point that satisfies a condition may be used as the relative point for performing autonomous operations. For example, the edge of a milling cut (e.g., Point B in FIG. 5) may be used as the relative point for performing an autonomous operation, such as dumping material, paving, and/or the like. In this case, the point with the highest height (e.g., Point B) may be marked as the relative point from which to perform autonomous operations.

As indicated above, FIG. 5 is provided as an example. Other examples may differ from what is described in connection with FIG. 5.

Figure 6:
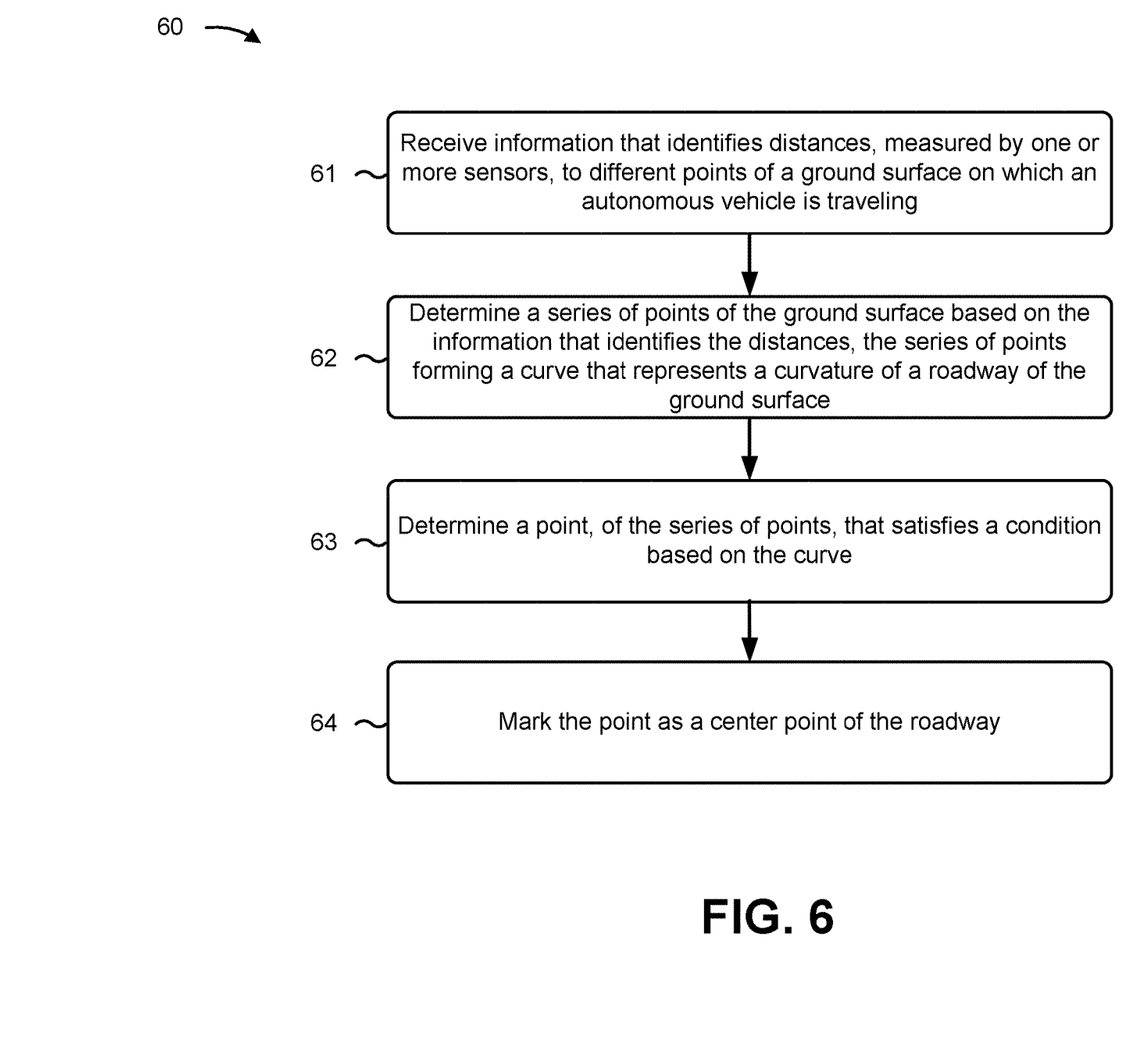
FIG. 6 is a flow chart of an example process for roadway center detection for autonomous vehicle control.

FIG. 6 is a flow chart of an example process 60 for roadway center detection for autonomous vehicle control. One or more process blocks of FIG. 6 may be performed by a controller (e.g., controller 22) and/or by another component or a group of components separate from or including the controller, such as control system 20, vehicle 10, and/or the like.

As shown in FIG. 6, process 60 may include receiving information that identifies distances, measured by one or more sensors, to different points of a ground surface on which an autonomous vehicle is traveling (block 61). For example, the controller (e.g., using a processor, a memory, and/or the like) may receive information that identifies distances, measured by the one or more sensors 21, to different points of a ground surface on which the autonomous vehicle 10 is traveling, as described above.

As further shown in FIG. 6, process 60 may include determining a series of points of the ground surface based on the information that identifies the distances, the series of points forming a curve that represents a curvature of a roadway of the ground surface (block 62). For example, the controller (e.g., using a processor, a memory, and/or the like) may determine a series of points of the ground surface based on the information that identifies the distances, as described above. The series of points may form a curve that represents a curvature of a roadway of the ground surface.

As further shown in FIG. 6, process 60 may include determining a point, of the series of points, that satisfies a condition based on the curve (block 63). For example, the controller (e.g., using a processor, a memory, and/or the like) may determine a point, of the series of points, that satisfies a condition based on the curve, as described above.

As further shown in FIG. 6, process 60 may include mark the point as a center point of the roadway (block 64). For example, the controller (e.g., using a processor, a memory, and/or the like) may mark the point as a center point of the roadway, as described above.

Process 60 may include variations and/or additional implementations to those implementations described in connection with FIG. 6, such as any single implementation or any combination of implementations described elsewhere herein. Although FIG. 6 shows example blocks of process 60, in some implementations, process 60 may include additional blocks, fewer blocks, different blocks, or differently arranged blocks than those depicted in FIG. 6. Additionally, or alternatively, two or more of the blocks of process 60 may be performed in parallel.

INDUSTRIAL APPLICABILITY

An autonomous vehicle (e.g., vehicle 10) may operate on a roadway, and may include a control system 20 to assist with automated steering and/or automated work implement control based on detection of a roadway feature, such as a center of a roadway. In some situations, the roadway may not include lane markings, such as when the roadway is unpaved or unmarked. The control system 20 and processes described herein assist with determining the center of the roadway when the roadway does not include lane markings. Thus, the center of the roadway may be determined with improved accuracy when the roadway is not marked, thereby leading to improved autonomous control of the vehicle 10 and/or a work implement 14 of the vehicle 10. The techniques described herein may also be employed when the roadway is marked, which may improve accuracy of roadway center detection.

The techniques described herein may result in more accurate control of a vehicle 10 and/or a work implement 14 than can be achieved by an operator. Furthermore, these techniques may permit an operator (if one is present) to focus on other tasks. For example, if the control system 20 is used for automated steering, the operator can focus on controlling a work implement. Similarly, if the control system 20 is used for automated control of a work implement, the operator can focus on steering. If the control system 20 is used for both automated steering and automated control of a work implement, the operator can focus on quality control or other aspects of vehicle operation. In some cases, the techniques described herein may permit the vehicle 10 to operate without an operator or with an operator that assist with vehicle operation remotely.

Furthermore, the techniques described herein may be used as an alternative to detecting a roadway center using GPS and/or supplement detecting a roadway center using GPS, which may be less accurate than a required accuracy for control of steering and/or a work implement. For example, GPS may have a position accuracy of around 3 centimeters, whereas some work implements 14 and/or vehicles 10 have an accuracy requirement of less than 3 centimeters, such as 5 millimeters.

What is claimed is:

1. A method for detecting a roadway center, comprising:
    receiving, by a control system of an autonomous vehicle, information that identifies distances to one or more objects located in proximity of the autonomous vehicle;
    detecting, by the control system, a ground surface based on the information that identifies the distances;
    determining, by the control system, a series of points of the ground surface based on the information that identifies the distances,
        the series of points forming a curve that represents a curvature of a roadway on the ground surface;
    determining, by the control system, a point, of the series of points, relative to one or more other points of the series of points;
    marking, by the control system, the point as a center point of the roadway; and
    transmitting, by the control system, an instruction to control a drive system of the autonomous vehicle or an implement system of the autonomous vehicle based on marking the point as the center point.

2. The method of claim 1, wherein determining that the point has a highest height along the curve.

3. The method of claim 2, wherein the point with the highest height along the curve is marked as the center point of the roadway based on a determination that a left edge of the roadway and a right edge of the roadway have heights that are within a threshold tolerance.

4. The method of claim 1, wherein determining that the point has a height that is approximately halfway between a highest height of a point along the curve and a lowest height of a point along the curve.

5. The method of claim 4, wherein the point with the height that is approximately halfway between the highest height and the lowest height is marked as the center point of the roadway based on a determination that a left point of the roadway and a right point of the roadway have heights that are not within a threshold tolerance.

6. The method of claim 1, further comprising:
    determining that multiple points satisfy a condition;
    providing output that identifies the multiple points;
    receiving operator input to identify the point from the multiple points; and
    marking the point as the center point based on receiving the operator input.

7. The method of claim 1, wherein the point is marked as the center point based on validating a geographic position of the point using positioning data received from a positioning system.

8. The method of claim 1, further comprising:
    determining a plurality of center points of the roadway based on the information that identifies the distances; and
    using the plurality of center points for autonomous driving or autonomous implement control.

9. A control system of an autonomous vehicle, comprising:
    memory;
    one or more sensors; and
    one or more processors, communicatively coupled to the memory, configured to:
        receive information that identifies distances, measured by the one or more sensors, to different points of a ground surface on which the autonomous vehicle is traveling;
        determine a series of points of the ground surface based on the information that identifies the distances,
            the series of points forming a curve that represents a curvature of a roadway of the ground surface;
        determine a point, of the series of points, based on the curve; and
        mark the point as a center point of the roadway.

10. The control system of claim 9, wherein each point, of the series of points, is represented in the memory using a first coordinate that represents a position of the point along the curve in a first dimension and a second coordinate that represents a height of the point in a second dimension; and
    wherein the condition is based on the second coordinate.

11. The control system of claim 9, wherein the point has a highest height along the curve.

12. The control system of claim 9, wherein the point has a height that is approximately halfway between a first height of a highest point along the curve and a second height of a lowest point along the curve.

13. The control system of claim 9, wherein the one or more processors are further configured to:
    determining that multiple points satisfy a condition;
    provide output that identifies the multiple points;
    receive operator input to identify the point from the multiple points; and
    mark the point as the center point based on receiving the operator input.

14. The control system of claim 9, wherein the one or more processors, when determining the series of points, are further configured to: determine that a first portion of the ground surface is associated with a height offset relative to a second portion of the ground surface; and offsetting the height offset to determine the series of points.

15. An autonomous vehicle, comprising:
    a sensor; and
    one or more controllers configured to:
        receive information that identifies distances, measured by the sensor, to different points of a roadway;
        generate a representation of a curve based on the information that identifies the distances,
            the representation of the curve including a series of points that represent a curvature of the roadway;

identify a point, of the series of points, based on the representation of the curve; and store an indication that the point is a center point of the roadway.

16. The autonomous vehicle of claim 15, wherein the one or more controllers, when identifying the point, are configured to determine that the point has a highest height along the curve.

17. The autonomous vehicle of claim 15, wherein the one or more controllers, when identifying the point that satisfies the condition, are configured to determine that the point has a height that is approximately halfway between a highest height along the curve and a lowest height along the curve.

18. The autonomous vehicle of claim 15, wherein the one or more controllers are further configured to:

determine a first lateral distance between the sensor and the point;

determine a lateral offset between a position of the sensor on the autonomous vehicle and a target point on the autonomous vehicle;

determine a second lateral distance between the point and the target point based on the first lateral distance and the offset; and transmit an instruction to control a drive system or an implement system of the autonomous vehicle based on the second lateral distance.

19. The autonomous vehicle of claim 18, wherein the target point is included in a centerline of the autonomous vehicle or is aligned with an implement of the vehicle that is to operate on the roadway.

20. The autonomous vehicle of claim 15, wherein the one or more controllers are further configured to transmit an instruction to control a drive system or a work implement of the autonomous vehicle based on determining the point.

* * * * *